(12) United States Patent  
Shircliff et al.

(10) Patent No.: US 9,141,912 B2  
(45) Date of Patent: Sep. 22, 2015

(54) BUILDING ANALYTIC DEVICE

(71) Applicant: INTELLIGENT BUILDINGS, LLC, Charlotte, NC (US)

(72) Inventors: Thomas Shircliff, Charlotte, NC (US); Robert Murchison, Charlotte, NC (US)

(73) Assignee: INTELLIGENT BUILDINGS, LLC, Charlotte, NC (US)

( * ) Notice: Subject to any disclaimer, the term of this patent is extended or adjusted under 35 U.S.C. 154(b) by 276 days.

(21) Appl. No.: 13/873,447

(22) Filed: Apr. 30, 2013

(65) Prior Publication Data

US 2013/0297550 A1 Nov. 7, 2013

Related U.S. Application Data

(60) Provisional application No. 61/642,891, filed on May 4, 2012.

(51) Int. Cl.  
*G06N 5/02* (2006.01)  
*G06F 3/00* (2006.01)

(52) U.S. Cl.  
CPC . *G06N 5/025* (2013.01); *G06N 5/02* (2013.01)

(58) Field of Classification Search  
CPC ..................................................... G06N 5/025  
See application file for complete search history.

(56) References Cited

U.S. PATENT DOCUMENTS

| | | | |
|---|---|---|---|
| 8,368,321 B2 * | 2/2013 | Chemel et al. | 315/294 |
| 2004/0220702 A1* | 11/2004 | Matsubara et al. | 700/291 |
| 2012/0232701 A1* | 9/2012 | Carty et al. | 700/277 |
| 2014/0297206 A1* | 10/2014 | Silverman | 702/58 |

* cited by examiner

*Primary Examiner* — Alan Chen  
(74) *Attorney, Agent, or Firm* — Vedder Price, P.C.

(57) ABSTRACT

An information analytic system including an information gathering unit configured to gather at least one piece of information from at least one of a plurality of devices connected to a network, an information analysis unit configured to analyze the gathered information, and a rule generation unit configured to generate at least one rule based on the analysis performed by the information analysis unit. The rule analysis unit is configured to analyze each generated rule to identify the rules that can be applied to the corresponding piece information, and to apply applies the identified rule to the corresponding piece of information. The rule analysis unit is also configured to analyze unapplied rules and to determine what additional information is required to apply each unapplied rule to at least one piece of information.

18 Claims, 7 Drawing Sheets

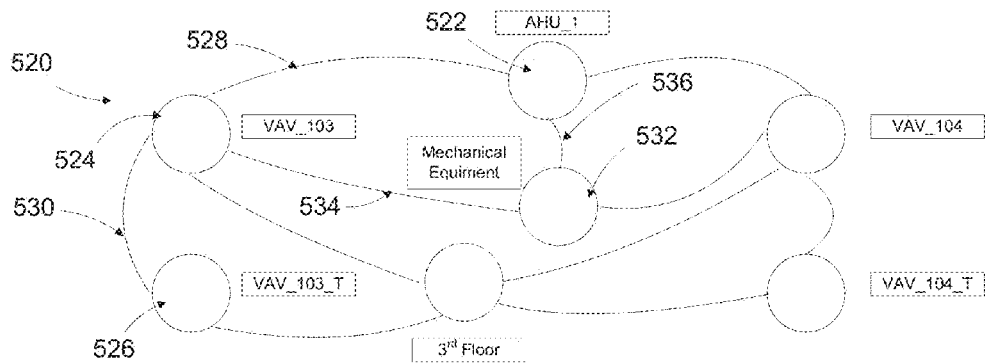
FIG 5B
| Point Category | Point Value | Associated Device Type | Associated Point | Associated Point Value |
|---|---|---|---|---|
| Temperature | > 75 Deg F | Air Handling Unit | Fan Voltage | < 0.5 volts |
| Pressure | >1.5 inches | Air Handling Unit | Fan Voltage | < 0.5 volts |
FIG 6
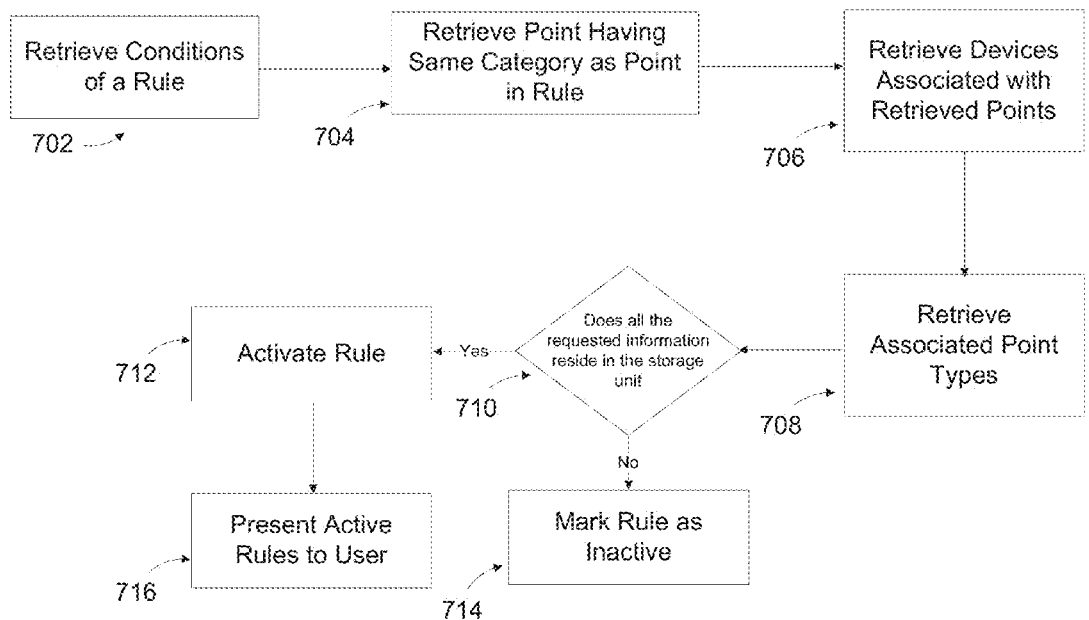
FIG 7

BUILDING ANALYTIC DEVICE

RELATED APPLICATIONS

This application is a non-provisional application that claims the benefit of and the priority from U.S. Provisional Application No. 61/642,891, filed May 4, 2012, titled "Building Analytic Device"

BACK GROUND OF THE INVENTION

Automation systems are used to control different processes and monitor different environmental and operational conditions in a facility. As automation systems have gained wider acceptance, the size and breadth of the environmental and operational conditions monitored has consistently grown. A conventional automation system can monitor and store thousands of conditions.

Because of the expansion in the size of automation systems, analyzing the information gathered by these systems has become difficult. In addition, the complexity of the interaction of different systems operating in facilities has increased the complexity of this analysis. Because of this added complexity, analytical models have been developed to assist in the analysis of the data stored in automation systems. However, these models require a professional, such as an engineer, to review the information stored in the automation system to determine analytical rules that can be applied to the automation system to streamline the operation of the systems in the building.

Many times, the amount of data stored in a building automation system makes the cost of reviewing the information in the automation system impractical. Further, because of the large amount of data to review, many analytical rules that may be implemented are not apparent to the person reviewing the data, and are never implemented. Accordingly, a need exists for a system that can simplify the selection of operational rules based on information provided by an automation system.

SUMMARY OF THE INVENTION

Various embodiments of the present disclosure provide an information analytic system including an information gathering unit configured to gather at least one piece of information from at least one of a plurality of devices connected to a network, an information analysis unit configured to analyze the gathered information, and a rule generation unit configured to generate at least one rule based on the analysis performed by the information analysis unit. The rule analysis unit is configured to analyze each generated rule to identify the rules that can be applied to the corresponding piece information, and to apply the identified rule to the corresponding piece of information. The rule analysis unit is also configured to analyze unapplied rules to determine what additional information is required to apply each unapplied rule to at least one piece of information.

Another embodiment includes an information analysis unit for analyzing information gathered from a network, the information analysis unit includes a memory and a processor that execute an application. The application gathers at least one piece of information from at least one of a plurality of devices connected to the network, analyzes the gathered information, generates at least one rule based on the analysis of each piece of information, analyzes each generated rule to identify each rule that can be applied to a corresponding piece of information, applies each identified rule to the corresponding piece of information, and analyzes each unapplied rule to determine what additional information is required to apply each unapplied rule to at least one piece of information.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

The features and advantages of aspects of the present invention will become more apparent from the detailed description set forth below when taken in conjunction with the claims and drawings, in which like reference numbers indicate identical or functionally similar elements.

FIG. 5B depicts the information storage unit of FIG. 2A storing information in a graph database;

FIG. 6 depicts a user interface that generates a predetermined analytical rule that is stored in the rule storage unit of FIG. 2A;

FIG. 7 depicts a schematic representation of the rule analysis unit of FIG. 2A automatically generating a list of rules based on the points stored in the information storage unit;

DETAILED DESCRIPTION

Figure 1:
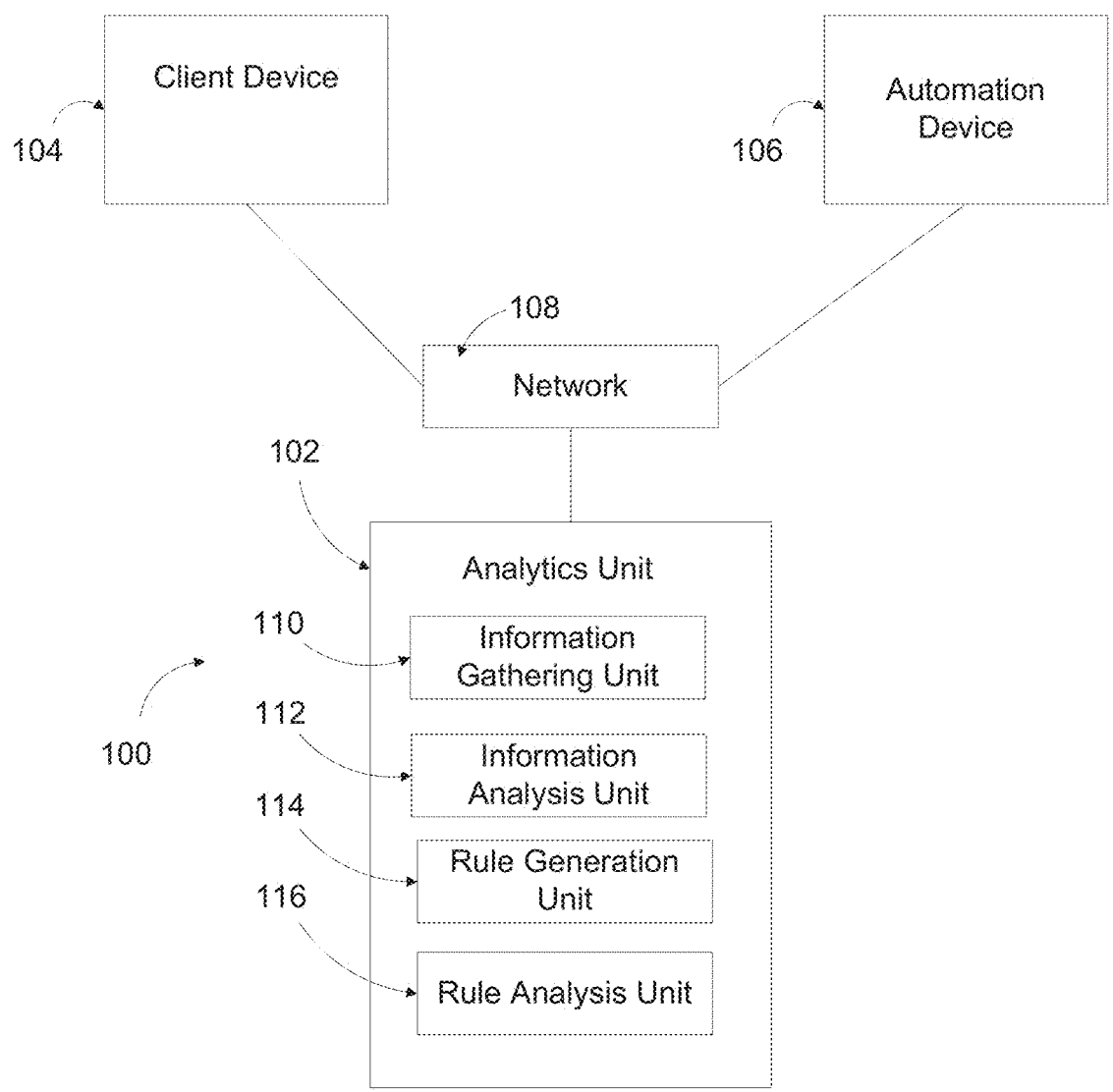
FIG. 1 is a block diagram of a building analytic system suitable for use with the methods and systems consistent with the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

FIG. 1 depicts a block diagram of a building analytic system 100 suitable for use with the methods and systems consistent with the present invention. The building analytic system 100 comprises a plurality of computers 102 and 104 and a plurality of automation devices 106 are shown each connected to one another via a network 108. The network 108 is of a type that is suitable for connecting the computers 102 and 104 and automation devices 106 for communication, such as a circuit-switched network or a packet-switched network. Also, the network 108 may include a number of different networks, such as a local area network, a wide area network such as the Internet, telephone networks including telephone networks with dedicated communication links, connectionless network, and wireless networks. In the illustrative example shown in FIG. 1, the network 108 is the Internet. Each of the computers 102 and 104, and the automation device 106, shown in FIG. 1 is connected to the network 108 via a suitable communication link, such as a dedicated communication line or a wireless communication link.

Computer 102 may serve as an analytic unit that includes an information gathering unit 110, an information analysis unit 112, a rule generation unit 114, and a rule analysis unit 116. The number of computers and the network configuration shown in FIG. 1 are merely an illustrative example. One having skill in the art will appreciate that the data processing system may include a different number of computers 102 and 104, automation devices 106, and networks 108. For example, computer 102 may include the information gathering unit 110, as well as, the information analysis unit 112. Further, the rule analysis unit 116 may reside on a different computer than computer 102.

Figure 2A:
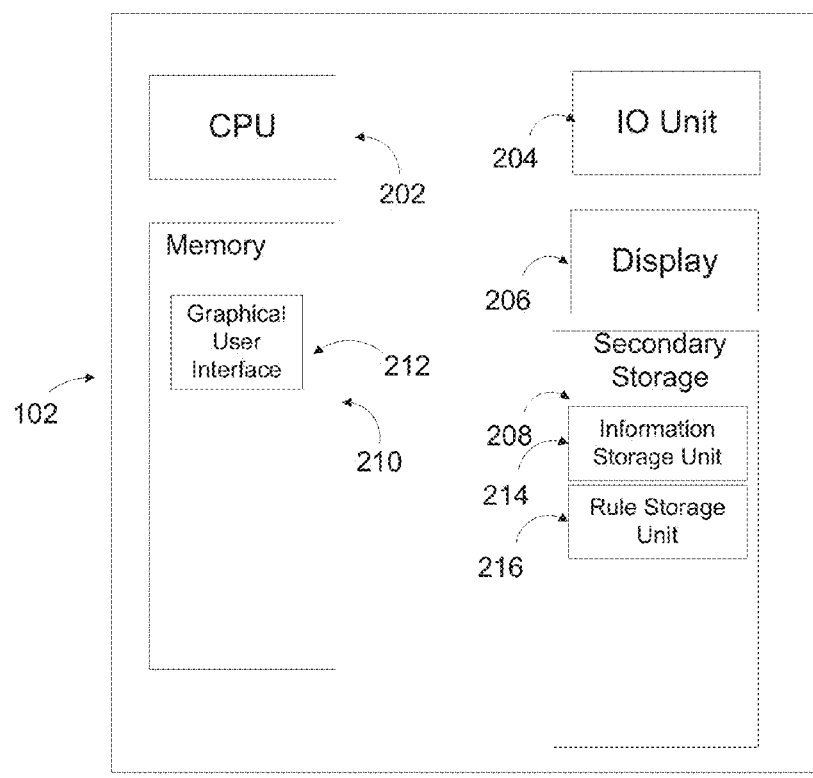
FIG. 2A is a more detailed depiction of the analytic unit included in the analytic system of FIG. 1.

FIG. 2A shows a more detailed depiction of the analytic unit 102. The analytic unit 102 comprises a central processing unit (CPU) 202, an input output (I/O) unit 204, a display device 206, a secondary storage device 208, and a memory 210. The analytic unit 102 may further comprise standard input devices such as a keyboard, a mouse, a digitizer, or a speech processing means (each not illustrated).

The analytic unit 102's memory 210 includes a Graphical User Interface (GUI) 212 which is used to gather information from a user via the display device 206 and I/O unit 204 as described herein. The GUI 212 includes any user interface capable of being displayed on a display device 206 including, but not limited to, a web page, a display panel in an executable program, or any other interface capable of being displayed on a computer screen. The secondary storage device 208 includes an information storage unit 214 and a rule storage unit 216. Further, the GUI 212 may also be stored in the secondary storage unit 208. In one embodiment consistent with the present invention, the GUI 212 is displayed using commercially available hypertext markup language (HTML) viewing software such as, but not limited to, Microsoft Internet Explorer®, Google Chrome® or any other commercially available HTML viewing software.

One having skill in the art will appreciate that the information storage unit 214 may be distributed across a different number of computers 102 and 104, automation devices 106, and networks 108. For example, computer 102 may include a portion of the information storage unit 214, and another computer 102 connected to the network 108 may include another portion of the information storage unit 214.

Figure 2B:
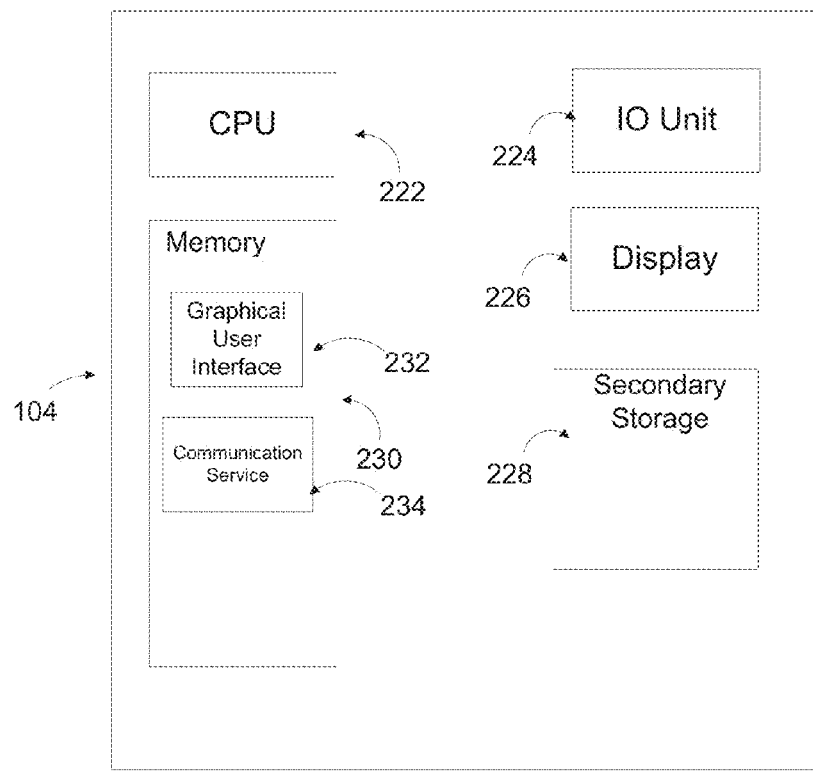
FIG. 2B is a more detailed depiction of a user computer included in the analytic system of FIG. 1.

FIG. 2B shows a more detailed depiction of user computer 104. Computer 104 comprises a CPU 222, an I/O unit 224, a display device 226, a secondary storage device 228, and a memory 230. Computer 104 may further comprise standard input devices such as a keyboard, a mouse, a digitizer, or a speech processing means (each not illustrated).

The memory 230 in computer 104 includes a GUI 232 which is used to gather information from a user via the display device 226 and I/O unit 224 as described herein. The GUI 232 includes any user interface capable of being displayed on a display device 226 including, but not limited to, a web page, a display panel in an executable program, or any other interface capable of being displayed on a computer screen. The GUI 232 may also be stored in the secondary storage unit 228. In one embodiment consistent with the present invention, the GUI 232 is displayed using commercially available HTML viewing software such as, but not limited to, Microsoft Internet Explorer®, Google Chrome® or any other commercially available HTML viewing software.

Figure 2C:
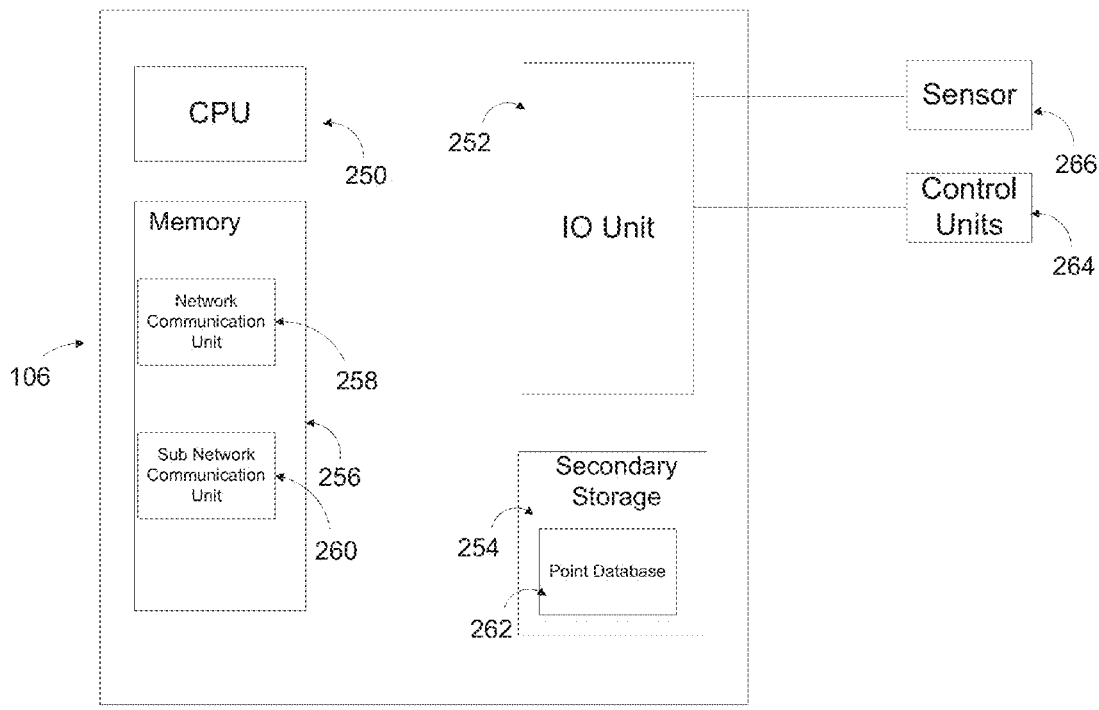
FIG. 2C is a more detailed depiction of an automation unit included in the analytic system of FIG. 1.

FIG. 2C depicts a more detailed depiction of an automation device 106. The automation device 106 includes a CPU 250, an IO unit 252, a secondary storage unit 254, a memory 256 that includes a network communication unit 258, and a subnetwork communication unit 260. The IO unit 252 is communicatively coupled to a plurality of sensors 266 and control units 264. Each sensor 262 is configured to sense environmental information and transmit the sensed information back to the IO unit 252. Each control unit 264 is electronically or mechanically coupled to a device such that the control unit 264 converts a signal transmitted from the IO unit 252 into a signal capable of effecting the operation of the device coupled to the control unit 264. The sensors 266 and control units 264 may be coupled to the IO unit 252 via a wired or wireless connection.

The network communication unit 258 is configured to connect to the network 108. The subnetwork communication unit 260 is configured to connect to a second network (not shown), or subnetwork, to communicate with other automation units 106. The subnetwork may be a network operating unit the TIA/EIA-485 protocol, TIA/EIA, 422 protocols, the TIA/EIA 232 protocol, or any other protocol capable of connecting to at least one automation device 106. The automation device 106 may communicate with other automation devices 106 over the network communication unit 258, or subnetwork communication unit 260, using any communication protocol including BACnet, Modbus, LONworks, Fieldbus, CANbus, Profibus, TCP/IP, Ethernet, or any other communication protocol. The automation device 106 may only include the subnetwork communication unit 260 or both the network communication unit 258 and the subnetwork communication unit 260.

The automation device 106 may be, but is not limited to, a voice over internet protocol (VOIP) phone, a network switching device, a building automation control device, a lighting automation control device, a telephone switching device, an IP camera, a digital video recorder, or any other device capable of communicating over a network.

The automation device 106 may also include a point database 262 stored in the secondary storage unit 254. A point is defined as any virtual object or real device coupled to the automation device 106. As an illustrative example, a temperature sensor that is mounted on a wall and wired in to an automation device 106 represents a point. In addition, a variable stored in the memory 256 of the automation device, such as a temperature set point, is also considered to be a point herein.

Figure 3:
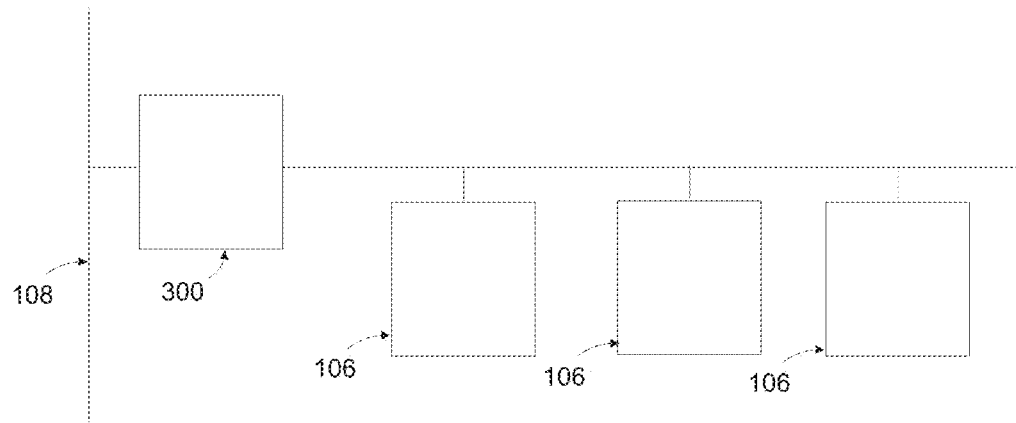
FIG. 3 depicts a plurality of automation units connected together on a subnetwork.

FIG. 3 depicts a plurality of automation units 106 connected together. The plurality of automation units 106 are communicatively coupled to a master automation device 300. The master automation device 300 is configured to convert information from the subnetwork for transport over the network 108. Each of the automation units 106 is configured to gather information on environmental conditions, and to control mechanical and electrical devices that affect the monitored environmental conditions. The master automation device 300 converts requests for information from the network 108 to a format suitable for transport over the subnetwork, and gathers information from the automation units 106 connected to the subnetwork to generate a response to the request.

Figure 4:
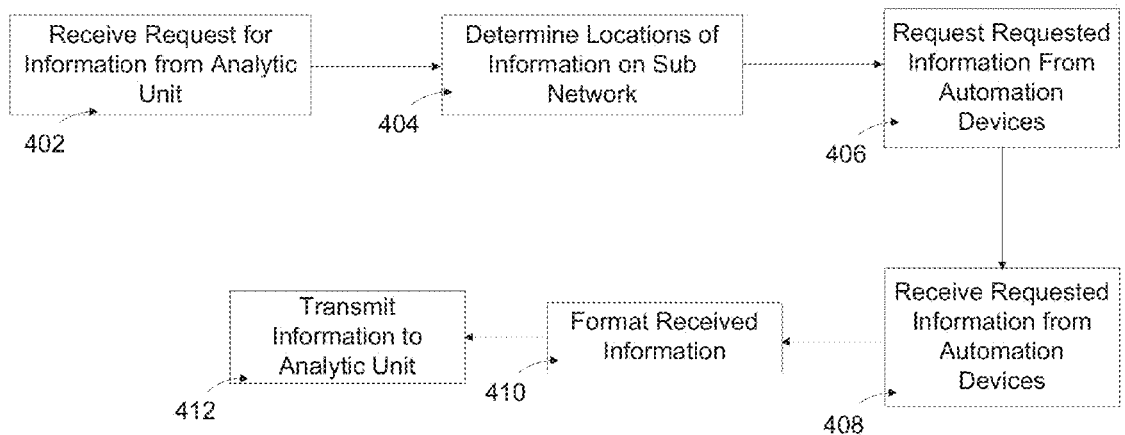
FIG. 4 depicts a schematic representation of the analytic unit included in the analytic system of FIG. 1 requesting information from an automation device connected to the network.

FIG. 4 depicts a schematic representation of the analytic unit 102 requesting information from an automation device 106 connected to the network 108. In step 402, a master automation device 300 coupled to the network 108 receives a request for information from the analytic unit 102. In step 404, the automation devices 106 determine the location in the memory 256 of the master automation device 300, or the location on the subnetwork, where the requested information is stored. In step 406, the master automation device 300 requests the information from the local memory 256, or from the automation devices 106 connected to the subnetwork. In step 408, each automation device 106 on the subnetwork receives the request from the master automation device 300, and transmits any information related to the request back to the master automation device 300. In step 410, the master automation device 300 formats the response based on the requirements of the analytic unit 102. The format of the response may be based on information received from the analytic unit 102 as part of the request. In step 412, the master automation device 300 transmits the response back to the analytic unit 102.

Figure 5A:
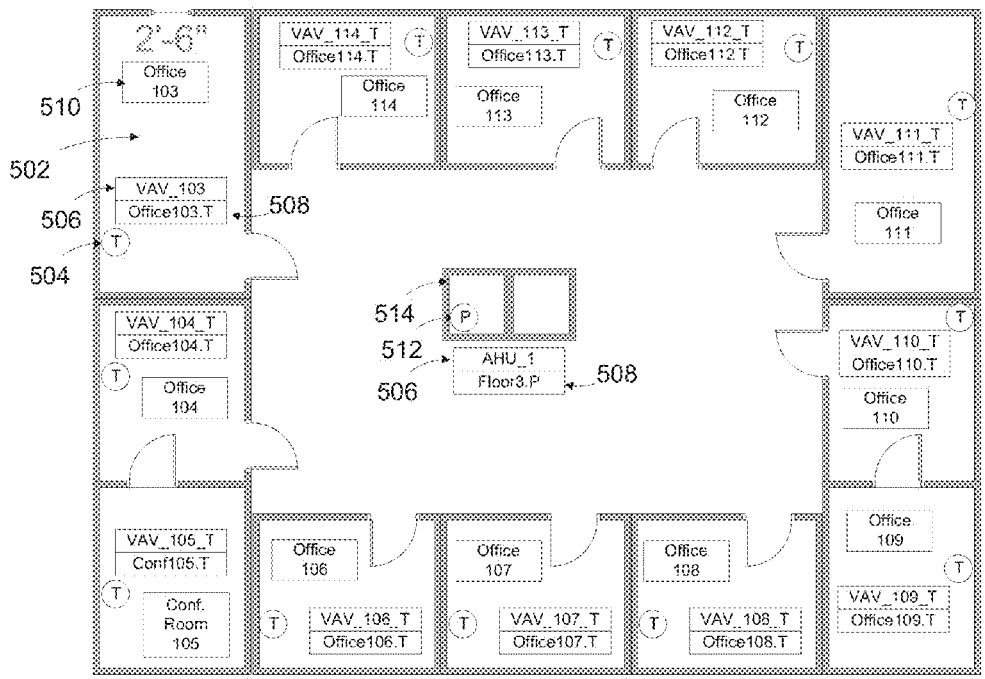
FIG. 5A depicts a floor plan showing an automation system and mechanical system information.

FIG. 5A depicts a floor plan 500 showing the object name and controller name for each sensor. The floor plan 500 includes a plurality of rooms 502. Each room includes a temperature sensor icon 504 with an information box 506 positioned next to the temperature sensor icon 504 that indicates an automation device indicator 506 and a point name indicator 508. Each point name indicator 508 is configured to match a corresponding point name stored in the memory 256 of the automation device 106 as indicated by the device indicator 506. The device indicators 506 are configured to match the names of the automation devices 106 connected to the master automation device 300.

Each room on the floor plan 500 also includes a room name indicator 510. The room name indicator 510 indicates the name, and potentially the use, for each room shown on the floor plan 500. The floor plan 500 may also include a pressure sensing unit icon 512 positioned in an elevator shaft 514. The pressure sensing unit icon 512 may include a device indicator 506 and a point name indicator 508.

The floor plan 500 may be stored in a digital format in the memory 210 of the analytic unit 102, or the memory 230 of a client device 104. The digital format may be viewable and editable in a drafting program such as AutoCAD®, provided by AutoDesk Corp. of San Rafael, Calif. The file may also be generated by an building information modeling ("BIM") software package such as, but not limited to, CADMEP by Technical Sales International, or any other BIM software. The drafting and BIM software programs are configured to store information pertaining to the design of a building in different layers of the file. Each layer includes information such as location, operational parameters, dimensions, and other information of equipment depicted in the floor plan. The information analysis unit 112 is configured to extract all information including the room name indicator 510, device indicator 506, and point name indicator 508 from each floor plan stored in the floor plan file, and to store the extracted information in the information storage unit 214.

The information analysis unit 112 may also associate pieces of information extracted from the file together based on the location, operation, physical connection, or logical connections of each piece of information. As an illustrative example referring to FIG. 5A, the information analysis unit 112 may associate the point Office_103_T with the VAV_103 automation device. The information analysis unit 112 may associate the VAV_103 automation device with a variable air volume (VAV) mechanical unit for room 103 (VAV_103), based on the information extracted from the file. Further the information analysis unit 112 may also determine that VAV_103 is associated with a specific air handling unit (AHU), and associate VAV_103 with the AHU. The information analysis unit 112 may determine the relationships between devices by extracting and analyzing information in the file, such as a schedule of devices, a wiring diagram, a mechanical system flow diagram, or any other data structure in the file that provides information on the relationships between devices on the floor plan.

The information analysis unit 112 may also extract information pertaining to the configuration and relationships of the mechanical and electrical systems in the building. As an illustrative example, the information analysis unit 112 may extract information pertaining to the heating, ventilating and air conditioning systems connected to each room. The information analysis unit 112 may extract the name and location of the AHU connected to office 103 via duct work, and store this information in the information storage unit 214. The information analysis unit 112 may also create a relationship between each point and a mechanical or electrical device based on the information extracted from the file. The information analysis unit 112 may also be configured to scan the floor plan to identify the different pieces of mechanical and electrical equipment included on each floor plan. Data may be extracted from a drafting program using any known method including exporting the attributes of objects in the drafting program. As an illustrative example, the information analysis unit may extract a listing of all mechanical equipment objects in a drawing along with the attributes for the mechanical equipment. The attributes of each object may be configured to store information pertaining to the relationship of the object to other mechanical devices. As an illustrative example, the VAV_103 object may include attributes such as the connected air handling unit object identifier, control system object name, or any other attribute describing the interconnection between VAV_103 and other systems in the facility.

The information analysis unit 112 may extract the information from a drafting program, such as AutoCAD, and import the information into the information storage unit 214 during initial configuration of the system. The information analysis unit 112 may create objects in the information storage unit 214 corresponding to the points displayed on the floor plan and associate these objects with extracted location indicators and connected mechanical equipment.

The information analysis unit 112 may also extract information pertaining to the configuration and use of each space on the floor plan. As an illustrative example referring to FIG. 5A, the information analysis unit 112 may extract the dimensions, wall size and thickness, and direction of the windows for each office and store this information in the information storage unit 214. The information analysis unit 112 may also extract information on the operation of the mechanical and electrical devices on the floor plan.

Once all the information is extracted from the floor plan 500, the information analysis unit 112 categorizes each point in the information storage unit 214 based on the value of the information, in the case of an input, or the signal the point is generating, in the case of an output. The information analysis unit 112 may categorize each point in the information storage unit 214 by presenting each point to a user of the information analysis unit 102 via the GUI 212. The information analysis unit 112 may also categorize the spaces defined in the file, such an office or a conference room, along with the characteristics of the space. The characteristics of a space may include the direction the space faces, the dimensions of the space, the operational use for the space, the anticipated or actual occupancy of the space, or any other attribute that can attributed to the space. Further, the information analysis unit 112 may also identify any other data structure from the information and categorizes the identified data structures into predefined categories.

FIG. 5B depicts the information storage unit 214 storing information in a graph database. A graph database is a known data structure that stores data in a graph structure including nodes, edges, and properties. A graph database allows for the interrelation of different nodes. The information storage unit 214 may incorporate any known graph database including, but not limited to, Horton provided by Microsoft Corporation of Redmond Wash., Neo4j by Neo Technologies, or any other graph database software. The information storage unit 214 may store each piece of information from the floor plan 500 as a node in a graph database. The information analysis unit 112 may also relate each of the nodes together based on physical and logical connections between each node.

Returning to FIG. 5B as an illustrative example, AHU_1 522, VAV_103 524, and VAV_103_T 526 are created as nodes in the information storage unit 214. The information analysis unit 114 logically relates AHU_1 522 with VAV_103 by edge 528, because AHU_1 and VAV_103 are physically connected by ductwork. VAV_103_T is logically related to VAV_103 by edge 530, because VAV_103_T controls the operation of VAV_103. In addition, VAV_103 is logically related to a "Mechanical Device" category 532 by edge 534, because VAV_103 is a mechanical air control device. AHU_1 is also related to the "Mechanical Device" category 532 because AHU_1 is also a mechanical device. Further, VAV_103 and VAV_103_T are related to a "$3^{rd}$ Floor" category because both devices are physically located on the third floor of the building.

The information analysis unit 112 continues to relate all points entered into the information storage unit 214 based on the physical location of each point, and the mechanical or electrical systems the point monitors or controls. The information analysis unit 112 may extract a list and position of all mechanical devices on the each floor of a building, and relate each mechanical device to points extracted from the file, and to other mechanical devices in the building. The system may perform the same analysis for electrical devices in the building. Further, the system may relate extracted mechanical devices to extracted electrical devices. The system may also assign different attributes to the edges connecting each node. As an illustrative example, for the AHU node, the connecting edges may include model and manufacturer information for the AHU.

FIG. 6 depicts a user interface 600 that generates a predetermined analytical rule that is stored in the rule storage unit 216. The rule generation unit 114 allows a user to configure predefined rules that are stored in the rule storage unit 216. A predetermined rule represents a set of conditions that initiate an event when the conditions are satisfied. The user interface allows a user to select a point type 602, based on the types of points stored in the information storage unit 214, a point value 604 to initiate an analysis or event, a device type 606 associated with the point category to analyze in connection with point category, another point 608 associated with the associated device category, and a value 610 for the associated point that initiates analysis or an event. FIG. 7 depicts a schematic representation of the rules analysis unit 116 automatically generating a list of rules based on the points stored in the information storage unit 216. In step 702, the rule analysis unit 116 retrieves the conditions of a first rule stored in the rule storage unit 216. In step 704, the rule analysis unit 116 requests a listing of points consistent with the point type included in the rule. In step 706, the rule analysis unit 116 determines the points in the listing of points that are associated with the device type of the rule.

In step 708, the rule analysis unit 116 determines if the device associated with each point includes the associated point type for the rule. In step 710, the rule analysis unit 226 determines whether the information required by the rule resides in the system. In step 712, if all the information required by the rule resides in the information storage unit 214, the rule analysis unit 116 indicates that the rule in the rule storage unit 216 is active, and begins logging the values of the points associated with the rule in the information storage unit 214 over a predefined interval. In step 714, if all the information required by the rule does not reside in the information storage unit 214, the rule analysis unit 116 indicates that the rule is inactive in the rule storage unit 216. In step 716, the activated rules are display to a user via the GUI 212.

The information gathering unit 110 generates a list of all points included in the active rules, and requests the values associated with the point names from the automation devices 106 where the points reside. The information gathering unit 110 logs the values returned from the automation devices 106 in the information storage unit 208. As the point log in the information storage unit 214 is updated by the information gathering unit 110, the rule analysis unit 116 analyzes the point information stored in the information storage unit 214 based on the rule, or rules, associated with each point, and initiates events when the conditions of any of the associated rules are satisfied. An event may include the generation of a report, email, alarm, or any other type of notification or action.

Figure 8A:
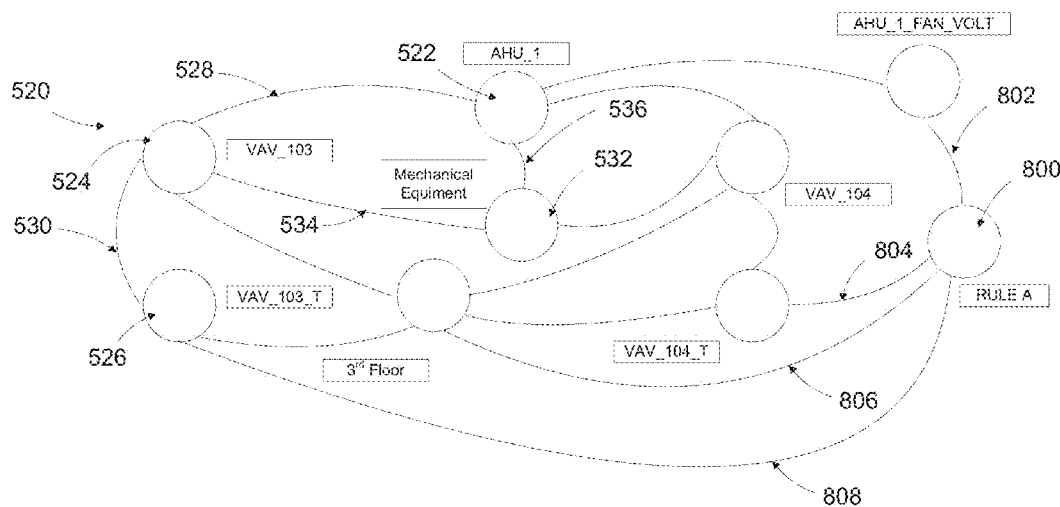
FIG. 8A depicts an illustrative example of the rule analysis unit of FIG. 2A storing rule information in the information storage unit.

FIG. 8A depicts an illustrative example of the rule analysis unit 114 storing rule information in the information storage unit 214. A rule A is created that monitors the fan voltage on AHU1 and VAV 104_T. The graph database in the information storage unit 214 relates the AHU_1_FAN_VOLT point to the VAV_104_T point by edges 802 and 804 respectively. The information storage unit 214 stores the information in a graph database such that each rule is related to all points associated with the rule. In addition, each rule may be associated with a location in the building or to a specific device. Returning to FIG. 8A, rule A is also associated with the $3^{rd}$ floor by edge 806. Rule A may also be related to VAV_103_T by edge 808. Accordingly, a single rule may be related to multiple points. The rule analysis unit 116 activates a specific rule based on the relationship between points stored in the database as they apply to the specific rule.

As an illustrative example using the information from FIG. 6, the rule analysis unit 116 may request a list of all air handling units that are related to a temperature sensor and a fan voltage. The rule will then be applied to all of the related points satisfying this request as previously discussed.

Figure 8B:
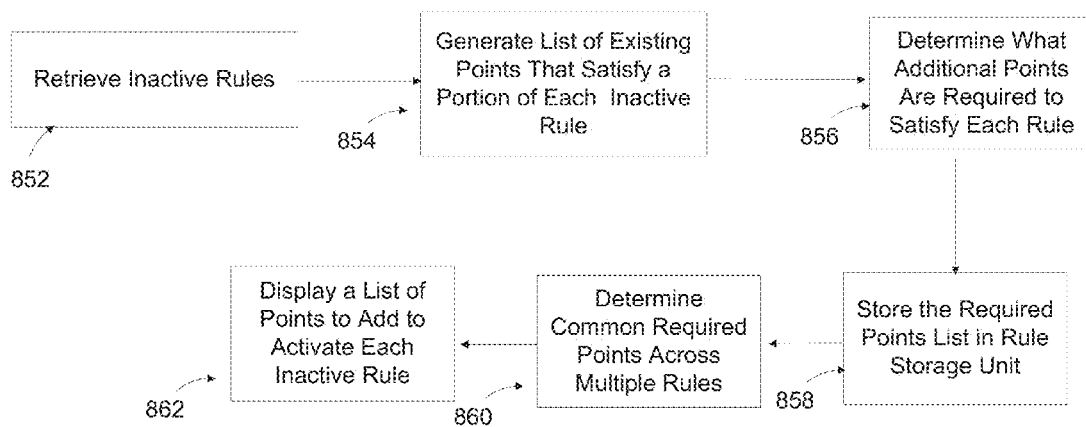
FIG. 8B depicts a schematic representation of the rule analysis unit generating a list of inactive rules that may be cost effectively activated.

FIG. 8B depicts a schematic representation of the rule analysis unit 116 generating a list of inactive rules that may be cost effectively activated. In step 852, the rule analysis unit 116 retrieves a list of inactive rules from the rule storage unit 216. In step 854, the rule analysis unit 116 requests a listing of existing points that would potentially satisfy each inactive rule. A point potentially satisfies a rule if it satisfies any of the category requirements of the rule. Using FIG. 6 as an example, a temperature sensor related to an air handling unit would potentially satisfy a portion of the first rule in the list of FIG. 6.

In step 856, the rule analysis unit 116 analyzes each rule to determine what additional point information is required to satisfy a remaining portion of each rule. In determining that additional point information required to satisfy a rule, the rule analysis unit 116 may compare the point categories associated with the points categories in the rule to determine if the all of the point categories of the rule exist in the system for each device. As an illustrative example, the rule analysis unit 116 may compare the point categories for a first rule with the point categories associated with a specific air handling unit. If the air handling unit being analyzed does not include a point category in the rule, the rule analysis unit 116 identifies the missing category and associates the missing point category with the air handling unit being analyzed.

In step 858, the rule analysis unit 116 stores the required points list in the rule storage unit 216 along with the required location and/or required device connections for each point. Referring again to FIGS. 5A and 6, if the fan voltage on AHU_1 is not installed, the rule analysis unit 116 would identify the fan voltage on AHU_1 as a missing point that is required to satisfy the first rule in FIG. 6. The rule analysis unit 116 would also determine that adding a fan voltage sensor to AHU_1 would allow for the activation of the first rule in FIG. 6 for VAV_103.

In step 860, the rule analysis unit 116 determines the points on different devices that are common to multiple rules. Because the required points are stored in a graph database that relates the points to devices and locations, the rule analysis unit 116 can generate a list of rules that can be activated by adding a single point. As an illustrative example referring to FIGS. 5A and 6, the first rule in FIG. 6 requires AHU_1 have a fan voltage to be implemented. The addition of a fan voltage on AHU_1 would allow for the activation of the first rule in FIG. 6 in relation to VAV_103 to VAV_114. In addition, the addition of the fan voltage on AHU_1 will also allow for the activation of the second rule in FIG. 6 in relation to the $3^{rd}$ floor. Accordingly, the addition of a single point can have a very large impact on the number of activated rules.

In step 862, the rule analysis unit 116 may display a listing of missing points to add on each system, and the associated rules that may be activated by the addition of the points. The rule analysis unit 116 may configure the displayed information such that a user can view the number of rules that may be activated by adding a missing point to a specific device. Accordingly, the user is able to determine the impact of adding additional points to the automation system. The report may also generate an estimated cost to add each missing point, and the projected economic impact of the activation of each rule. The cost estimation may be performed using known estimating techniques, such as allocating a cost based on the point type, or any other estimating method.

The rule analysis unit 116 may also determine the cost savings associated with implementing a rule. The cost savings may be generated based on historical information from similar facilities that is stored in the information storage unit 214. The rule analysis unit 214 may also calculate the estimated time required to generate enough savings to pay the cost of installing an additional point.

The rule analysis unit 116 may assign a cost saving equation to each rule or device stored in the information storage unit 214. The cost saving equation may be related to the overall operation of a single device or multiple devices. Each cost saving equation may also be stored and associated with an individual device. As an illustrative example, a fan in an air handing unit may be assigned the following cost estimate equation: Cost Savings=0.745699872(Fan Horsepower)*(1 hour)*(Cost per kilowatt-hour), where the fan horsepower and cost per kilowatt hour are stored in the information storage unit 214. The rule analysis unit 116 may assign cost saving values to each rule in the in the information storage unit 214. Returning to the example, the rule analysis unit 116 may assign a value of minus one (1) hour of operation per day to a rule associated with the fan in the air handling unit, which represents a reduction of one (1) hour to the total daily operation of the fan if the rule is implemented. The value may be inputted by an end user or may be estimated based on data stored in the information storage unit 214.

To determine the cost savings to implement a rule associated with the air handling unit, the rule analysis unit 116 calculates the cost savings using the equation above to determine the cost of operation of the fan for one hour. The rule analysis unit 214 then calculates the number for fewer hours the fan would operate when the rule is implemented. The number of fewer of hours may be determined by examining schedules associated with the air handling unit that are gathered by the information gathering unit 110. The information may also be inputted by a user into the rule analysis unit 116. Returning to the illustrative example, if the fan is 50 horsepower and would operate for 1 hour less per day (the −1 value) and the fan operates 365 days per year, the total savings at 0.07 cents per kilowatt would be calculated as:

Cost Savings=0.745699872(50 hp)*(1 hour)*(0.07 cents/KWh)*(365 hours)=$952.63 per year.

The rule analysis unit 116 may display the estimated yearly cost savings of implementing the rule on the GUI.

The rule analysis unit 116 may also assign cost savings resulting from a reduction in maintenance, better operational efficiencies, and reduced operation of other related systems for each rule. Each additional cost savings reduction may be assigned to each rule and calculated using information stored in the information storage unit 214 or gathered from a user. While the example above illustrates the calculation of savings for a fan, the rule analysis unit 116 may determine cost savings for any rule by utilizing cost saving equations and information stored in the information storage unit 214.

Figure 8C:
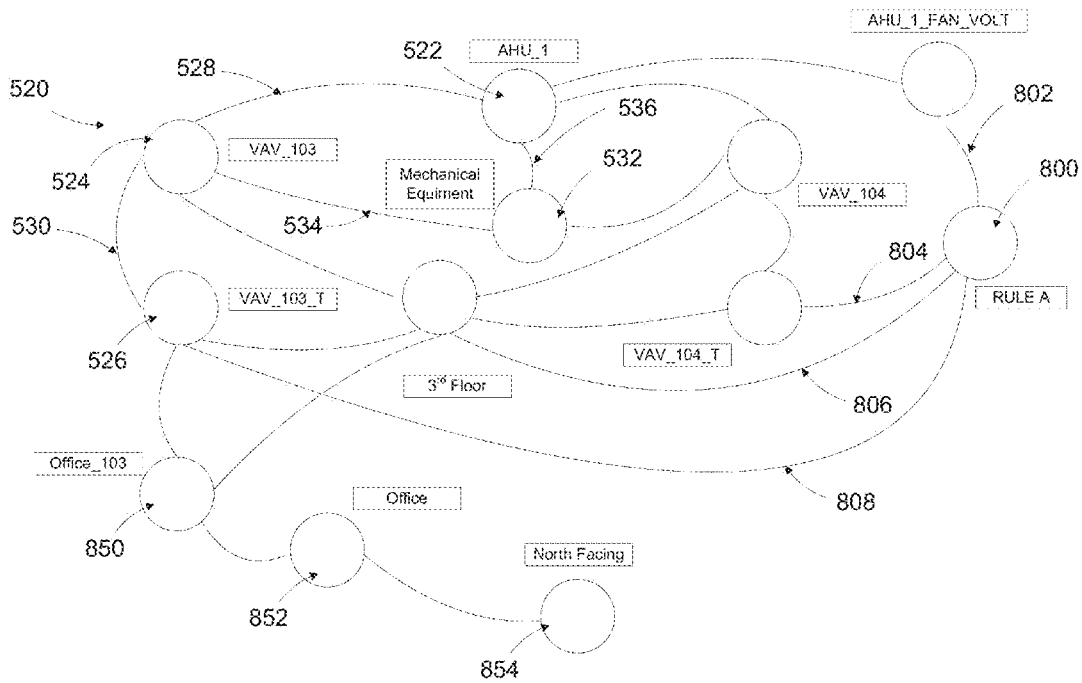
FIG. 8C depicts a schematic of the information storage unit of FIG. 2A relating the devices to a space in the building.

FIG. 8C depicts a schematic of the information storage unit 214 relating the devices to a space in the building. As an illustrative example, Office 103_T 526 is associated with the Office 103 850 on the floor plan in FIG. 5A. Office 103 850 is also related to the office category 852 indicating that the space is used as an office, and the North Facing 854 category indicating that the Office 103 faces north. The information analysis unit 112 may also relate Office 103 850 to other attributes associated with an office including occupancy of the office, the materials used to construct the room, or any other attribute of the office or the building. Each office node may also be related to other office nodes by floor or quadrant of a floor. Accordingly, point, mechanical device, electrical device, and space information can be interrelated in the information storage unit 214.

Figure 9:
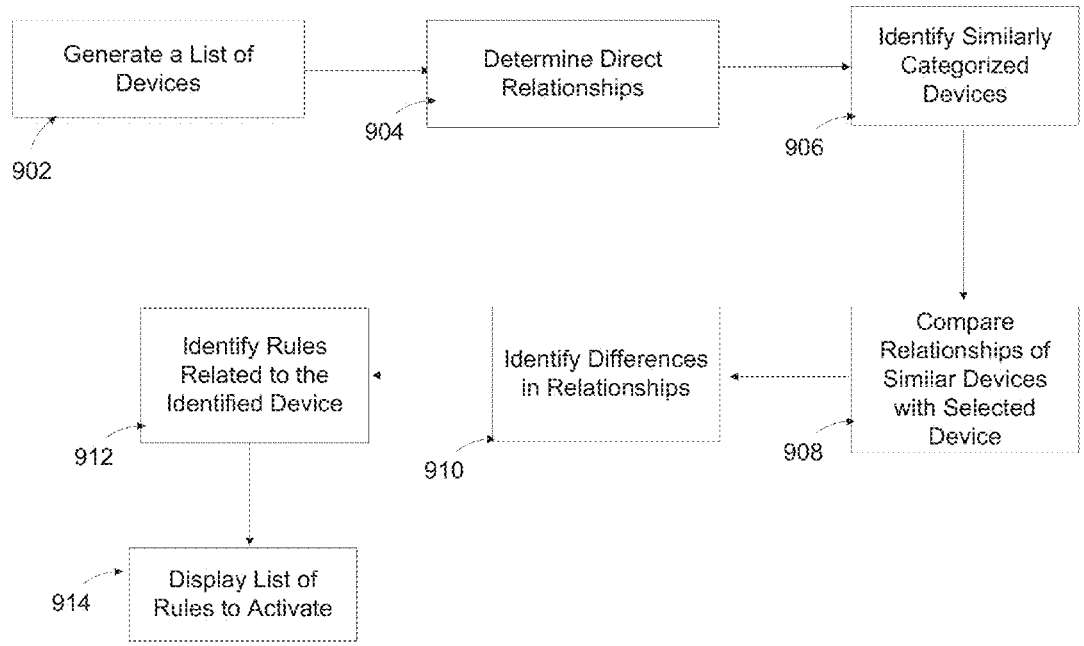
FIG. 9 depicts another embodiment of the rule analysis unit of FIG. 1 determining potential inactive rules that may be economically applied.

FIG. 9 depicts another embodiment of the rule analysis unit 116 determining potential inactive rules that may be economically applied. The rule analysis unit 116 may identify typical relationships between devices, points, and space information to determine the likelihood that a particular rule would be applied to a point or points. As an illustrative example, the rule analysis unit may identify the Office 103_T as being a space temperature sensor that is associated with office 103, the office 103 being associated with an office category, and the attribute north facing. The Office 103_T may also be associated with the $3^{rd}$ floor category and to VAV_103 524.

Returning to FIG. 9, in step 902, the rule analysis unit 116 generates a list of devices, and selects a first device for analysis. In step 904, the rule analysis unit 116 determines each direct relationship for the selected device by querying the information storage unit 214. In step 906, the rule analysis unit 116 identifies devices in the information storage unit 214 that are related to the same, or substantially similar, categories. In step 908, the rule analysis unit 116 compares the relationships of the identified devices with the relationships of the selected device. In step 910, the rule analysis unit 116 identifies relationships the identified device has established that are not established with the selected device. In step 912, the rule analysis unit 116 identifies rules related to the identified device that utilize the relationships identified in step 910. In step 914, the rule analysis unit 116 displays a listing of inactive rules that are activated for similar devices. The display may also present a listing of points that must be installed to initiate the rule.

The rule analysis unit 116 may also determine the frequency with which a rule is related to each identified device. As an illustrative example, if a rule is applied to half of the devices identified in step 906, the rule analysis unit 116 may display the rule along with an indication that 50% of similar devices activate the rule.

The rule analysis unit 116 may perform the same analysis performed in FIG. 9 using a space identifier or point identifier in place of the device. As an illustrative example, the rule analysis unit 116 may determine the relationships attached to a specific room type and generate a list of rules based on the rules applied to similar room types.

The rule analysis unit 116 may also present the rules used by a system on a GUI where users may rate the effectiveness of each rule. Further, the rule analysis unit 116 may analyze comments made by users on the implementation and effectiveness of each rule and utilize the gathered comments to rate each rule. As an illustrative example, the rule analysis unit 116 may generate a list of all active and inactive rules and present the rules in a list displayed on a GUI. A user can then view each rule and assign an effectiveness value to each rule based on the rule's effectiveness at the user's facility. Further, a user may interact with other users to generate conditions for implementing a specific rule, the information required to implement a specific rule, or modifications of a specific rule that may enhance the operation of the rule. The rule analysis unit may be configured to create new rules, or adjust existing rules, based on the comments, and additional information, provided by users.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. An information analytic system including:
    an information gathering unit configured to gather at least one piece of information from at least one of a plurality of devices connected to a network;
    an information analysis unit configured to analyze the gathered information;
    a rule selection unit configured to select at least one rule from a pre-defined set of rules based on the analysis performed by the information analysis unit;
    a rule analysis unit configured to analyze each selected rule to identify other rules from the pre-defined set of rules that can be applied to a corresponding piece information; and
    the rule analysis unit applies the identified rules to the corresponding piece of information,
    wherein,
    the rule analysis unit is configured to analyze unapplied rules and to determine what additional information is required to apply each unapplied rule to at least one piece of information.

2. The information analytic system of claim 1, wherein the information analysis unit categorizes and stores the information in an information storage unit.

3. The information analytic system of claim 2, wherein the information analysis unit relates each piece of information to another piece of information based on a category assigned to each piece of information.

4. The information analytic system of claim 2, wherein each piece of information is categorized based on at least, a location associated with each piece of information, a device associated with each piece of information, or an operational attribute of each piece of information.

5. The information analytic system of claim 2, wherein the information storage unit stores each piece of information in a graphical format in a database.

6. The information analytic system of claim 1, wherein the rule analysis unit generates a list of additional information to add to enable the application of an unapplied rule based on rules applied to similarly categorized pieces of information with similar relationships.

7. The information analytic system of claim 1, wherein the rule analysis unit continuously executes the conditions of each rule.

8. The information analytic system of claim 1, wherein each rule relates to the operation of a building system.

9. The information analytic system of claim 8, wherein each piece of information relates to a component of a building system.

10. An information analysis unit for analyzing information gathered from a network, the information analysis unit including a memory and a processor that execute an application, the application performing the steps of:
    gathering at least one piece of information from at least one of a plurality of devices connected to the network;
    analyzing the gathered information;
    selecting at least one rule from a pre-defined set of rules based on the analysis of each piece of information;
    analyzing each selected rule to identify other rules from the pre-defined set of rules that can be applied to a corresponding piece of information,
    applying each identified rule to the corresponding piece of information; and
    analyzing each unapplied rule to determine what additional information is required to apply each unapplied rule to at least one piece of information.

11. The information analysis unit of claim 10, wherein each piece of information is categorized and stored in the memory.

12. The information analysis unit of claim 11, wherein each piece of information is related to a corresponding piece of information based on the category of each piece of information.

13. The information analysis unit of claim 11, wherein each piece of information is categorized based on at least, a location associated with each piece of information, a device associated with each piece of information, an operational attribute of each piece of information, or any other attribute that can define each piece of information.

14. The information analysis unit of claim 11, wherein each piece of information is stored in a graphical format in a database residing in the memory.

15. The information analysis unit of claim 10, including the step of generating a list of additional information to add to enable the application of an unapplied rule based on rules applied to similarly categorized pieces of information with substantially similar relationships.

16. The information analytic system of claim 10, including the step of continuously executing the conditions of each rule.

17. The information analysis unit of claim 10, wherein each rule relates to the operation of a building system.

18. The information analytic system of claim 10, wherein each piece of information relates to a component of a building system.

* * * * *